United States Patent [19]

McClelland

[11] 4,261,019
[45] Apr. 7, 1981

[54] COMPATIBLE DIGITAL MAGNETIC RECORDING SYSTEM

[75] Inventor: S. Barry McClelland, Woodland Hills, Calif.

[73] Assignee: Micropolis Corporation, Canoga Park, Calif.

[21] Appl. No.: 98,381

[22] Filed: Nov. 29, 1979

[51] Int. Cl.³ .............................................. G11B 5/09
[52] U.S. Cl. ...................................... 360/40; 360/51
[58] Field of Search ............................. 360/39, 40, 51

[56] References Cited

U.S. PATENT DOCUMENTS 3,685,033   8/1972   Srivestava et al. .................... 360/40

OTHER PUBLICATIONS

A New Look-Ahead Code for Increased Data Density–George Jacoby, Intermag, 6/77.

Primary Examiner—Vincent P. Canney
Attorney, Agent, or Firm—Poms, Smith, Lande & Rose

[57] ABSTRACT

A magnetic recording system is provided which encodes four bits of an eight bit "byte" at a time, and is thus compatible with most general purpose data processing systems which process eight bit bytes. Also, the special magnetic recording code groups which are formed have at least two "0's" between each "1", and always include at least one "1" in each code group, thereby increasing the average frequency of magnetic transitions and reducing the requirements for the phase lock oscillator timing circuit compared to previous methods. In addition, the conversion circuitry for converting from the short data groups to the longer code groups is simplified by the use of a small "Programmable read Only Memory" or "PROM" and "EXCLUSIVE-OR" circuit logic to insure proper code bit groupings of "1's" and "0's" within each code group and at the transitions between code groups. Similar simplifications are accomplished in the implementation of the "Read" decoding logic; and the shift registers for buffering to the "Read" and "Write" Programmable Read-Only Memories, are shared, thereby minimizing the expense of the required serial-to-parallel conversion and returning the PROM parallel output to serial form.

14 Claims, 4 Drawing Figures

Fig. 2

| HEXIDECIMAL ADDRESS TO PROM | | 2 BITS OF PRIOR CODE GROUP | | NEW CODE GROUP | | | | | | | | |
|---|---|---|---|---|---|---|---|---|---|---|---|---|
| | | $P_6$ | $P_7$ | $P_0$ | $P_1$ | $P_2$ | $P_3$ | $P_4$ | $P_5$ | $P_6$ | $P_7$ | |
| 0 | 0 | 0 | 0 | 1 | 0 | 0 | 1 | 0 | 0 | 1 | — | ⎫ |
| 0 | 1 | 0 | 0 | 0 | 0 | 0 | 0 | 0 | 1 | 0 | — | |
| 0 | 2 | 0 | 0 | 0 | 0 | 0 | 0 | 1 | 0 | 0 | — | |
| 0 | 3 | 0 | 0 | 0 | 0 | 0 | 1 | 0 | 0 | 0 | — | |
| 0 | 4 | 0 | 0 | 0 | 0 | 1 | 0 | 0 | 0 | 0 | — | |
| 0 | 5 | 0 | 0 | 0 | 1 | 0 | 0 | 0 | 0 | 0 | — | |
| 0 | 6 | 0 | 0 | 1 | 0 | 0 | 1 | 0 | 0 | 0 | — | PRIMARY CONVERSION ($P_7=0$) |
| 0 | 7 | 0 | 0 | 0 | 0 | 0 | 1 | 0 | 0 | 1 | — | |
| 0 | 8 | 0 | 0 | 0 | 0 | 1 | 0 | 0 | 0 | 1 | — | |
| 0 | 9 | 0 | 0 | 0 | 1 | 0 | 0 | 0 | 0 | 1 | — | |
| 0 | A | 0 | 0 | 1 | 0 | 0 | 0 | 0 | 0 | 1 | — | |
| 0 | B | 0 | 0 | 0 | 0 | 1 | 0 | 0 | 1 | 0 | — | |
| 0 | C | 0 | 0 | 0 | 1 | 0 | 0 | 0 | 1 | 0 | — | |
| 0 | D | 0 | 0 | 1 | 0 | 0 | 0 | 0 | 1 | 0 | — | |
| 0 | E | 0 | 0 | 0 | 1 | 0 | 0 | 1 | 0 | 0 | — | |
| 0 | F | 0 | 0 | 1 | 0 | 0 | 0 | 1 | 0 | 0 | — | ⎭ |
| 1 | 0 | 0 | 1 | 0 | 0 | 0 | 1 | 0 | 0 | 1 | — | ⎫ |
| 1 | 1 | 1 | 0 | 0 | 0 | 0 | 0 | 0 | 1 | 0 | — | |
| 1 | 2 | 1 | 0 | 0 | 0 | 0 | 0 | 1 | 0 | 0 | — | |
| 1 | 3 | 1 | 0 | 0 | 0 | 0 | 1 | 0 | 0 | 0 | — | |
| 1 | 4 | 1 | 0 | 0 | 0 | 1 | 0 | 0 | 0 | 0 | — | |
| 1 | 5 | 1 | 0 | 0 | 1 | 0 | 0 | 0 | 0 | 0 | — | |
| 1 | 6 | 0 | 1 | 0 | 0 | 0 | 1 | 0 | 0 | 0 | — | CONVERSION IF PRIOR $P_6$ IS INITIALLY "1" |
| 1 | 7 | 1 | 0 | 0 | 0 | 0 | 1 | 0 | 0 | 1 | — | |
| 1 | 8 | 1 | 0 | 0 | 0 | 1 | 0 | 0 | 0 | 1 | — | |
| 1 | 9 | 1 | 0 | 0 | 1 | 0 | 0 | 0 | 0 | 1 | — | |
| 1 | A | 0 | 1 | 0 | 0 | 0 | 0 | 0 | 0 | 1 | — | |
| 1 | B | 1 | 0 | 0 | 0 | 1 | 0 | 0 | 1 | 0 | — | |
| 1 | C | 1 | 0 | 0 | 1 | 0 | 0 | 0 | 1 | 0 | — | |
| 1 | D | 0 | 1 | 0 | 0 | 0 | 0 | 0 | 1 | 0 | — | |
| 1 | E | 1 | 0 | 0 | 1 | 0 | 0 | 1 | 0 | 0 | — | |
| 1 | F | 0 | 1 | 0 | 0 | 0 | 0 | 1 | 0 | 0 | — | ⎭ |

ARROWS INDICATE CHANGES

NOTE: ADDRESSES AND DATA OUTPUT HIGH TRUE

COMPATIBLE DIGITAL MAGNETIC RECORDING SYSTEM

FIELD OF THE INVENTION

This invention relates to data processing systems including special conversion circuitry for changing data into special code groups which permit higher density recording.

BACKGROUND OF THE INVENTION

In systems for the magnetic recording of digital information, it has previously been proposed to convert the input data into special longer code groups and to indicate the presence of a "1" by a magnetic transition from one state to another. An article which discloses such a system and its advantages is entitled "A New Look-Ahead Code for Increased Data Density" by George V. Jacoby, presented at INTERMAG, June, 1977.

In the Jacoby article, three data bits are converted into six code bits, with each binary "1" being spaced apart by at least two binary "0's", and this restriction is carried over even to interfaces between adjacent code groups through certain logical algorithms. However, the nature of the system proposed in the above-mentioned article is such that transitions from one magnetic state to the other need occur only every second code group, or once every 12 code bits and that data patterns may occur when the spacing is repeated indefinitely. This requires a very tightly controlled phase-locked oscillator that is capable of maintaining accurate clocking with a sustained pattern of one flux transition every 12 clock periods. In addition, the selection of groups of three data bits to produce the six bit code groups which are formed is generally incompatible with most data processing circuits which utilize and process digital information in eight bit "bytes", or in four bit half-bytes, where two half-bytes form a byte. This incompatibility results in the need for additional buffering circuitry as the information is transferred from the data processing circuit to magnetic storage, and additional buffering as the groups of three bits are received from magnetic storage and supplied back to the data processing circuitry which operates with eight bit bytes or four bit half-bytes.

Accordingly, one important object of the present invention is to develop a high density magnetic recording system which is efficient and inexpensive with data processing systems which operate on eight bit bytes or four bit half bytes.

Another object of the present invention is to increase the minimum sustained frequency of magnetic transitions in the encoded data, without sacrificing density of recording, to thereby substantially reduce the constraints or requirements on the phase lock oscillator which generates the timing or clocking signals for the system.

SUMMARY OF THE INVENTION

In accordance with one aspect of the invention, a new eight bit code has been developed in which each recorded code group always includes at least one binary "1", and in which the eight bit code represents four binary digits, or a half-byte of data as used in the associated data processing circuitry.

In accordance with a coordinate aspect of the invention, the phase lock oscillator which generates the clocking signals for the system may be of simpler construction than had previously been employed, as the minimum sustained frequency of occurrence of magnetic transitions, from which the oscillator timing signals are obtained, is greater than previously available in such systems. Conversely, for a phase locked oscillator of given design this encoding method should provide an improved data decoding margin compared to the Jacoby method, thus resulting in improved data transfer reliability.

One advantage of the present system is the minimization of buffering circuiry both in transferring information from the data processing circuitry to the magnetic recording or storage, and in returning information from storage to the data processing system so that the data processing circuit is more directly coupled to magnetic storage unit.

In accordance with a specific illustrative implementation of the invention, the encoding circuitry for converting four bit data groups into eight bit code groups includes a "write PROM" or "Programmable Read Only Memory", which has as inputs the four data bits and also the next-to-last bit from the prior eight bit code group. As outputs, the "write PROM" has the first finalized six bits of the new code group, the provisional seventh (or next to last) bit of the new code group, and the last bit of the previous code group. The last bit of the previous code group from the "PROM" is combined with the next-to-last bit retained from the previous code group in a logic circuit providing an "exclusive-or" function, so that, if the last digit of the previous code group is a "1", the next-to-last digit must be a "0". In this way, the constraint that the stream of code digits which is magnetically recorded includes binary "1's" not more frequently then every third bit, is maintained. Hence the encoding circuit for converting for bit data groups into eight bit code groups is simplified, and essentially includes only two shift registers and a "PROM" having a five bit input. The same type of logic circuit can be employed in similar data group to code group conversions, in which the data and code groups are longer or shorter than that described in detail above.

The decoding circuitry is similar in the reconstitution of the four bit half-bytes of data from the special eight bit code groups; and the reading and writing circuits alternate in the utilization of the pair of shift registers which buffer the serial inputs and outputs from the data processing circuitry with the read and write PROMS.

Other objects, features and advantages of the present invention will become apparent from a consideration of the following detailed description and from the accompanying drawings.

BRIEF DESCRIPTION OF THE DRAWINGS

FIG. 2 is a diagram indicating the code groups which are developed from successive four bit data groups, and how the code groups may depend on the last bits of the preceding code group;

DETAILED DESCRIPTION

Figure 1:
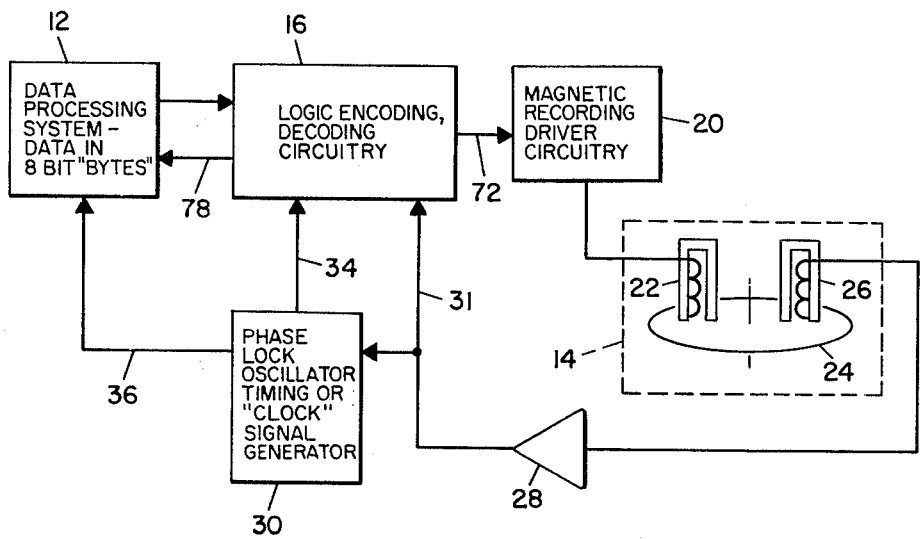
FIG. 1 is an overall block circuit diagram of a system illustrating the principles of the present invention.

Referring more particularly to the drawings, FIG. 1 is an overall block diagram showing a data processing system 12, and a magnetic recording unit 14. The data processing circuit 12 is conventional in that it processes data in eight bit bytes or four bit half bytes. In the input circuit between the data processing system 12 and the magnetic recording unit 14 are the logic encoding and decoding circuit 16, which converts four bit data groups into eight bit code groups as discussed in more detail below, and a magnetic recording driver circuit 20 which energizes the magnetic write head 22, to reverse the polarity on the disc 24 upon the occurrence of binary "1's" in the stream of code bits supplied from logic circuit 16 over lead 72. The read head 26 receives encoded information from the disc 24, supplies it to the amplifier 28 from which it is routed to the phase lock oscillator and timing signal generator circuit 30 and to the logic decoding circuit 16 over lead 31. Timing or "clock" signals are routed on leads 34 and 36 to the decoding circuit 16 and to the data processing system 12, from circuit 30.

Figure 4:
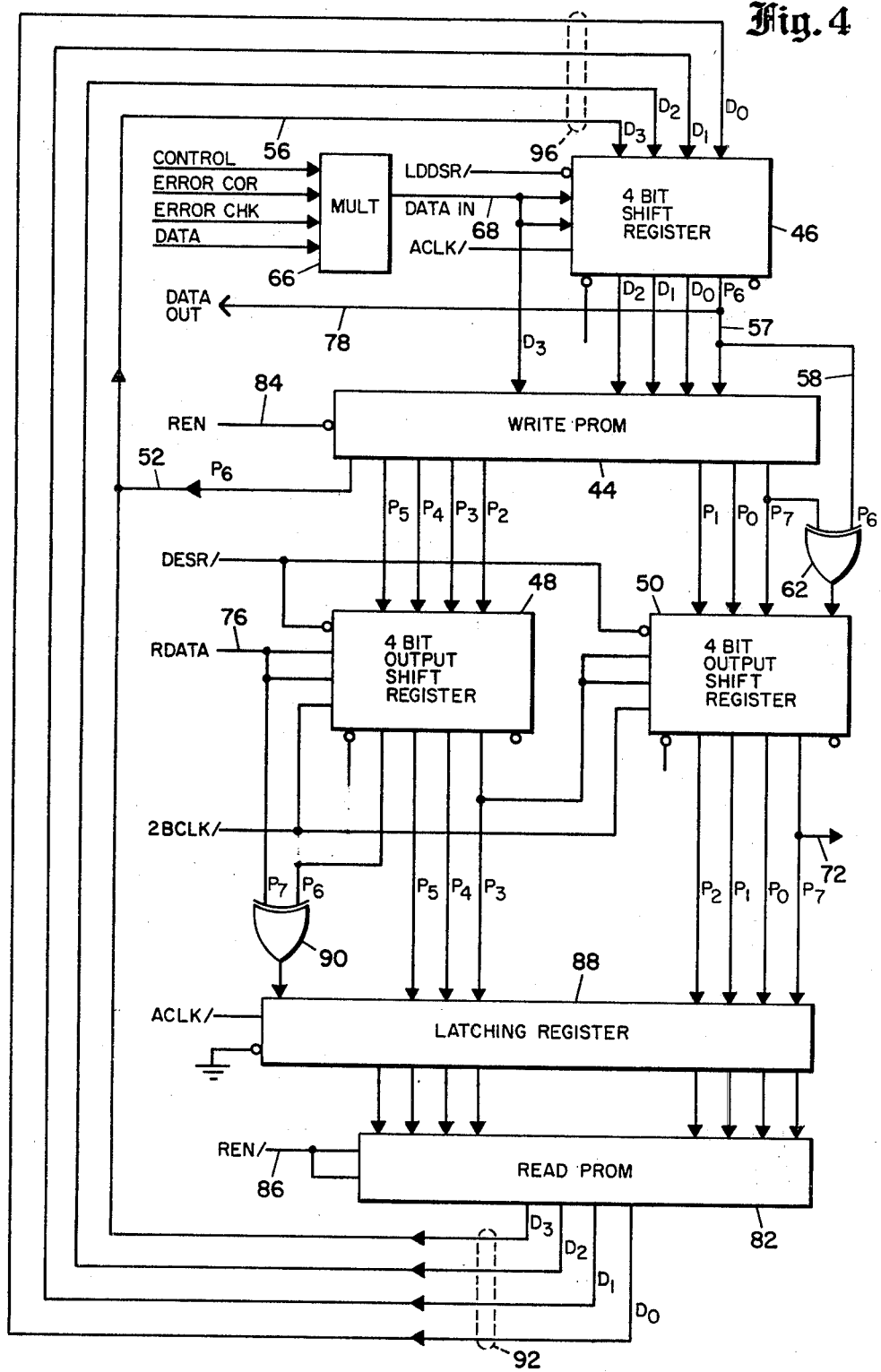
FIG. 4 is a logic circuit diagram showing the implementation of the code pattern as set forth in FIG. 2 of the drawings.

In the system of FIG. 1, and as will be disclosed in detail in FIG. 4 successive groups of four data bits supplied from the data processing system 12 to the logic conversion circuit 16, and the output from circuit 16 is a corresponding series of eight bit code groups which are eventually recorded on the magnetic disc 24.

In FIG. 2, the right-hand columns designated P-0 through P-7 represent the digital output from the logic conversion circuit 16, to driver circuit 20, as will be explained in greater detail below. However, the code group may depend, particularly at the interface between successive code groups, on the value of the digits in the last two digit places of the prior code group. Accordingly, to the left of the eight columns which are designated P-0 through P-7 of the "new code group" are included two bits, P-6 and P-7, of the prior code group. Incidentally, it may be noted that there are always at least two "0's" between each "1" in the code groups and this requirement is carried over to the transitions between code groups. To the left in FIG. 2 are the addresses to a programmable read-only memory or "PROM" which is a key component included within the logic conversion circuit 16 of FIG. 1. Incidentally, the "PROM" also appears at reference numeral 44 in FIG. 4, as will be discussed in detail below.

Now, returning to FIG. 2, the address to the PROM shown in the two left-hand columns of this diagram is set forth in what is known as "hexadecimal" form. When hexadecimal notation is used, a number is presented not in the decimal system, but in a system which has as its base 16, instead of 10. In counting in a hexadecimal system, one counts from 0 up through 9, and then instead of using double digit numbers to represent 10 through 15, the letters A through F are employed. Accordingly, when considering various addresses to the PROM which are set forth in the left-hand two columns of FIG. 2, the first address is "00", and represents the 0 address to the PROM, and results in an output code group from the PROM as shown to the right in the corresponding columns in FIG. 2. Similarly, the address "06" is the number 6 input to the PROM and produces the indicated output code group. Going on to the hexadecimal designations, the output "0C" refers to address number 12 of the PROM and again produces the indicated output code group shown to the right, possibly modified as discussed below.

The fifth input to the PROM is the next-to-last digit of the prior code group, designated "P-6". This appears as a "0" or a "1" as the most significant digit of the PROM address. Note that the first 16 entries in FIG. 2 have a 0 as the first digit of the PROM address, and this means that the code digit P-6 of the prior code group was a "0". However, in the second set of 16 code groups shown in the lower part of FIG. 2, the first digit of the PROM address is "1" indicating that P-6 from the prior 8 bit code group was a "1". Now, in each case the value of P-7 in accordance with the initial conversion is a 0. In order to satisfy the previously stated requirement that each "1" in the stream of code group bits be separated by two 0's, it is necessary when certain combinations appear at the transition between code groups, to reverse certain digits. For example, consider the primary conversion set forth adjacent the top or "00" PROM address. In this case P-0 is a "1". Now, with both P-6 and P-7, the last two bits of the prior code group both being equal to "0", there is no problem, and the criterion that two "0's" must appear between each "1" is satisfied. However, if P-6 from the prior code group had been a "1", this would have violated the criteria and a change would have been needed.

Figure 3:
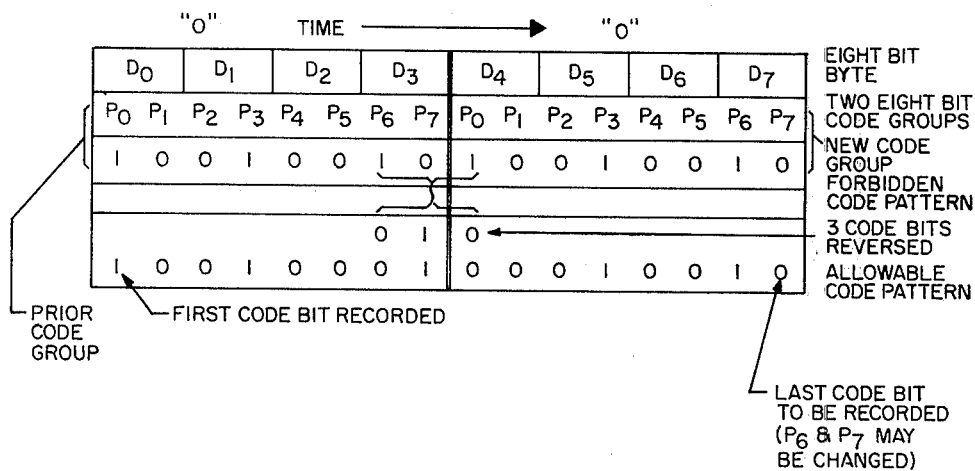
FIG. 3 is another diagram, illustrating a typical code group where reversal of certain digits is required at the transition between successive eight bit code groups.

FIG. 3 is a diagram showing how such a change is made. In FIG. 3 the prior code group is shown to the left, with the 8 digits P-0 through P-7 appearing for the four data bits D-0 through D-3 and the 8 bits P-0 through P-7 of the new code group constituting the translation of the data bits D-4 through D-7. It may be noted that, as originally written, P-6 and P-7 of the prior code group were a "1" and a "0", respectively. In addition, P-0 of the new code group was a "1". Accordingly, there was only one "0" between P-6 of the prior group and P-0 of the new group. Therefore, a change must be made. In accordance with the logical rules which have been developed, the code group "101" is changed to the code "010", and this change produces a pair of allowable code groups forming an allowable pattern which may be encoded, as indicated by the lowest line in FIG. 3. Unlike the upper train of bits in FIG. 3, the lower bit train includes at least two "0's" between each "1", and thus meets the high density encoding requirement of the system.

On a more general basis, the rule indicated in the diagram of FIG. 3 is, first, perform a primary conversion, with P-7 always being equal to 0, and therefore not necessarily appearing as an output from the PROM; and then secondly, look at the new P-0 and the old P-6 and if they are both "1's", change the old P-6 and the new P-0 to "0's" and substitute between them P-7 equal to "1".

Consideration will now be given to the detailed logic circuit diagram of FIG. 4 which shows the implementation of at least a key portion of the logic conversion circuit 16 of FIG. 1. In FIG. 4, the encoding arrangements will first be considered; and the decoding and the common use of certain circuits for both encoding and decoding will then be examined.

Initially, it may be noted that an important component in the circuit is the "write PROM" or programmable read only memory 44. The PROM 44 has five inputs, including the right-hand lead which is designated P-6 as it carries P-6 from the prior code group, and the leads designated D-0 through D-3 extending from right to left in FIG. 4 at the top of the PROM 44, and representing the four digits of the half byte of digital information which has been stored in the four bit shift register 46, after having been received over lead 68 in serial input form. The PROM 44 samples D-0 through D-3, and prior $P_6$ just as D-3 is arriving at the input to the shift register 46.

The outputs from the bottom of the PROM 44, as shown in FIG. 4, are seven bits of the new code group designated P-0 through P-6, and also at the far right, P-7 for the prior code group. Now, below the PROM 44 are two four bit shift registers 48 and 50 which are linked together to form an eight bit shift register. The inputs to the shift registers 48 and 50 are first (from right to left in FIG. 4) the code bit P-6 associated with the prior code group, which will be developed as discussed below, and then P-7, the last bit of the prior code group, and these are followed by P-0 through P-5 of the new code group. Note that the P-6 digit of the new code group as initially formulated in accordance with the primary conversion (upper portion of FIG. 2) is not routed to one of the shift registers 48 or 50 but is coupled via leads 52 and 56 to the left-hand input at the top of shift register 46. The timing is such that P-6 is entered in the first or left hand stage of shift register 46, and is shifted across, along with digits D-0, D-1 and D-2, so that at the time the output from Write PROM 44 is sensed, P-6 appears at output lead 57 at the output from register 46 and at the input to PROM 44. The prior P-6 also appears on lead 58 to the input 60 to the exclusive OR circuit 62. The other input to the exclusive OR circuit 62 is the digit P-7, also from the prior code group.

In passing, it is noted that "AND", "OR", and "EXCLUSIVE-OR" logic circuits are well known in the data processing field with an "AND" circuit providing an output only if all inputs are energized; an "OR" circuit providing an output if any input is energized; and an "EXCLUSIVE-OR" circuit providing an output if one but not both of its two inputs are energized.

Now, the steps in developing the changed code group as indicated in FIG. 3 will be briefly reviewed. First, normally, D-7 of the new group is not developed, because it is always, as a primary conversion (see upper portion of FIG. 2) considered to be 0. Therefore, the P-7 output from the PROM which appears as the far-right-hand output of the eight outputs at the bottom of PROM 44, is P-7 of the prior code group. Of course, both P-7 of the prior code group and P-0 of the new code group are automatically reversed, when appropriate, by virtue of the logic within the PROM 44, to produce the values for these two code bits as shown in the final lowermost line in FIG. 3. However, if old P-8 is a "1", this means that the old P-6 was also a "1", and accordingly, by virtue of the logic of the exclusive OR circuit 62, P-6 becomes a "0". This completes the logic inversion required for the few types of combinations when it is required. Incidentally, these five combinations are indicated by arrows extending inwardly at the lower left hand side of the table of FIG. 2, and inspection shows that these code groups where changes are required involve both the old P-6 initially being a "1" (lower half of FIG. 2), and the new P-0 also initially being a "1" (as shown in the corresponding original code groups in the upper portion of FIG. 2).

Of course, other collateral logic circuits of a conventional nature are also included in the circuitry discussed above in connection with FIG. 4. For example, circuit 66 is a multiplexer which selectively supplies data over lead 68 to the four bit shift register 46. During other time intervals, check bits or error correction bits may be supplied from multiplexer 66, in four bit "bytes", and encoded in the same manner as other data. Concerning other input leads shown in FIG. 4, these are conventional timing and control inputs.

Lead 72 at the output from the last stage of shift register 50 corresponds to lead 72 as shown in FIG. 1, with the eight bit shift register made up of registers 48 and 50 being operated as a single unit to provide a continuous stream of serial binary digits on lead 72. In the foregoing description, the encoding function involving converting groups of four serial data bits from multiplexer 66 on lead 68, into special eight bit code groups at lead 72, has been discussed. Now, the decoding function, involving the receipt of eight bit code groups which appear serially on lead 76 at the left of shift register 48, and the transmission of corresponding four bit serial data groups back to the data processing system on lead 78 from shift register 46, will be considered.

Initially, from an overall standpoint it will be useful to note that the shift registers 46, 48 and 50 are used, in different modes, for both the encoding and decoding functions. Further, when information is being stored on the magnetic disk 24 the write PROM 44 is enabled, and read PROM 82 is disabled and when information is being retrieved from storage, the read PROM 82 is enabled and the write PROM 44 disabled. These last functions are accomplished by the logic control signals designed "REN" or "read enable", and its inverse, designed "REN/", applied on leads 84 and 86 to PROMS 44 and 82, respectively.

Now, in the decoding function, coded information received on lead 76 is stepped through the eight bit shift register including registers 48 and 50; and when the last bit P-7 of the prior code group is at the last output register location of shift register 50, and the eight bits from the next code group are spaced along the other seven register locations of registers 48 and 50, with the last bit P-7 of the new code group at the input to register 48, the latching register 88 is enabled to hold the binary pattern at the input to the read PROM 82. In passing, it may be noted that latching register 88 may be dispensed with, if the Read Prom 82 has a sufficiently fast access time. Incidentally, an OR circuit 90 (or an exclusive OR circuit) combines P-6 and P-7 of the new code group to provide one of the eight inputs to read PROM 82.

The output from PROM 82 provides the original input four data bits, at the four output leads 92, in accordance with the inverse of the Table shown in FIG. 2, using the old P-7 and new P-0 through P-7 for conversion purposes. Incidentally, the output from the logic circuit 90 may be taken as equal to P-6 for the conversion purposes, as the presence of a "1" in either the P-6 or P-7 slot of the new code will indicate that P-6 was originally a "1". In passing, it may be noted that there are five pairs of different input eight bit code groups which will each give the same four bit output code groups. These are indicated by the arrows in the lower section of FIG. 2. Thus for example, both of the two eight bit code groups, in the order P-7, P-0, P-1 - - - P-6 which read 01001000, and 10001000 will produce an output on leads 92 of 0110, from D-0 through D-3, representing the number "6". These two code groups appear in the table of FIG. 2 under the PROM address designations 06 and 16 (with the initial "1" indicating that the prior P-6 code bit was a "1").

Returning to the circuit of FIG. 4, the four output leads 92 from the read PROM 82 are connected to input leads 96 to the successive stages of the shift register 46 toward the top of FIG. 4. Now, as the digits are shifted through shift register 46 from left to right, the four bit data half-byte appears serially at output lead 57 from the last stage of shift register 46 and is routed on lead 78 to the data processing system 12 as indicated in FIG. 1.

With regard to the phase lock oscillator 30, of FIG. 1, the design may be simpler as compared to that required by a system such as that cited hereinabove, or would have increased reliability, as discussed above, during the processing of random code groups. It may also be noted that the code pattern corresponding to repeated groups of "0" input data, as in typically used as a preamble for phase lock loop synchronization, has been specifically selected to yield a regularly spaced stream of flux transitions approximating the maximum frequency. This assists in the rapid synchronization of the phase lock oscillator.

Incidentally, it may be noted again that the logic encoding and decoding circuit 16 is coupled "directly" to the data processing system 12, to the exclusion of intermediate buffering circuitry for conversion from four bit half bytes to three bit data groups for encoding or the like; and in the present specification and claims the word "directly" shall have this significance.

In closing, it is to be understood the foregoing description is illustrative of the principles of the invention. Any suitable logic, storage, and data processing circuitry may be employed, and used with any of a wide variety of magneic disc or tape digital recording units. By way of example, but not of limitation, instead of using an "Exclusive-OR" circuit 62, other logic circuitry may be employed to make the logic value of P-6 a "0" when P-7 is a "1", as P-6 is always a "1" in order for P-7 to be a "1"; a single magnetic head may be employed for both reading and writing; and a single special memory essentially containing the table of FIG. 2 could be substituted for the two encoding and decoding PROMS as disclosed hereinabove. Accordingly, the present invention is not limited to that precisely as described hereinabove.

What is claimed is:

1. A digital data processing system including compatible high density magnetic recording, comprising:
    a data processing apparatus operating with eight bit "bytes" or four bit half-bytes of data;
    first logic conversion means for converting successive groups of four data bits or one "half-byte" from said data processing apparatus into eight bit code groups, with at least two binary 0's separating each binary 1 in the continuous output stream of code bits, and at least one binary 1 included in each code group;
    means for magnetically recording said code bits, with said binary 1's being represented by magnetic flux reversals;
    phase lock oscillator circuit means coupled to receive digital signals from said recording means and for generating timing or clock signals for said data processing system, said oscillator having the capability of maintaining synchronization with said code signals upon receipt of at least one binary 1 during each eight bit code interval;
    second logic conversion means for decoding said eight bit code groups and forming four bit data groups; and
    means for coupling both of said logic conversion means substantially directly with said data processing circuitry;
    whereby extensive buffering between said code groups and the eight digit bytes processed in said data processing apparatus is not required, and the need for a tightly controlled special phase lock oscillator is avoided.

2. A system as defined in claim 1 wherein said first logic conversion means includes a read-only memory, and wherein said memory has as inputs the four data bits and the next-to-last digit of the prior eight bit code group, and has as outputs, the last bit of the prior code group, and the first seven bits of the new eight bit code group, with the next-to-last digit of the new code group in its unmodified form.

3. A system as defined in claim 2 including an eight bit output shift register, an Exclusive OR logic circuit connected to the final stage of said shift register, and means for supplying the unmodified next-to-last bit from the prior code group and the last bit of the prior code group as supplied by the read only memory to said exclusive OR logic circuit, whereby the desired prior next-to-last bit is entered into the final stage of said shift register; and means for connecting the to last bit of the prior code group and the first six bits of the new code group in parallel to said shift register.

4. A system as defined in claim 2 including:
    an eight bit output shift register;
    logic circuit means for selectively changing a binary "1" to a binary "0" connected to the final stage of said shift register;
    means for supplying the unmodified next-to-last bit from the prior code group to said logic circuit means; and
    means for selectively controlling said logic circuit means in accordance with the last bit of the prior code group are supplied by the read only memory whereby the desired prior next-to-last bit is entered into the final stage of said shift register.

5. A system as defined in claim 1 wherein said phase lock oscillator is of limited capability to reliably maintain synchronization with such code information when binary "1's" occur at least once during each eight bit code group, but not when the binary "1's" are significntly less frequent.

6. A system as defined in claim 1 further comprising common shift register means employed during both encoding and decoding for converting between parallel operation within the encoding and decoding circuitry and serial operation.

7. A system as defined in claim 1 wherein said first logic conversion means includes means for insuring that either one or both of the sixth and seventh bits of each code group are binary "0 's".

8. A system as defined in claim 7 wherein said second logic conversion means includes a PROM having at one input the output of an OR circuit to which signals representing the sixth and seventh bits of the code group are supplied.

9. A digital data processing system including compatible high density magnetic recording, comprising:
    a data processing apparatus;
    means for providing groups of data bits from said data processing apparatus of a predetermined first length;
    first logic conversion means for converting successive groups of said data bits into code groups having a predetermined greater second length; with at least two binary 0's separating each binary 1 in the continuous output stream of code bits;

means for magnetically recording said code bits, with said binary 1's being represented by magnetic flux reversals;

said logic conversion means including a memory unit and wherein said memory unit has as inputs one of said groups of data bits and the next-to-last digit of the prior code group, and includes as outputs the last bit of the prior code group, and all of the bits except the last bit of the new eight bit code group, with the next-to-last bit of the new code group in its unmodified form;

said first logic conversion means further including an output shift register, an Exclusive OR logic circuit connected to the final stage of said shift register and means for supplying the unmodified next-to-last bit from the prior code group and the last bit of the prior code group as supplied by the PROM to said exclusive OR logic circuit, whereby the desired prior next-to-last bit is entered into the final stage of said shift register.

10. A digital data processing system including compatible high density magnetic recording, comprising:
a data processing apparatus;
means for providing groups of data bits from said data processing apparatus of a predetermined first length;
first logic conversion means for converting successive groups of said data bits into code groups having a predetermined greater second length; with at least two binary 0's separating each binary 1 in the continuous output stream of code bits;
means for magnetically recording said code bits, with said binary 1's being represented by magnetic flux reversals;
said logic conversion means including a memory unit and wherein said memory unit has as inputs one of said groups of data bits and the next-to-last digit of the prior code group, and includes as outputs last bit of the prior code group, and all of the bits except the last bit of the new eight bit code group, with the next-to-last bit of the new code group in its unmodified form;
said first logic conversion means further including an output shift register, logic circuit means for selectively changing a binary "1" to a binary "0" connected to the final stage of said shift register;
means for supplying the unmodified next-to-last bit from the prior code group to said logic circuit means; and
means for selectively controlling said logic circuit means in accordance with the last bit of the prior code group as supplied by said memory unit, whereby the desired prior next-to-last bit is entered into the final stage of said shift register.

11. A system as defined in claim 10 wherein said memory unit is a programmable read-only memory.

12. A system as defined in claim 10 wherein said groups of data bits are four bits in length, and wherein said code groups are eight bits long.

13. A digital data processing system including compatible high density magnetic recording, comprising:
a data processing apparatus operating with eight bit "bytes" or four bit half-bytes of data;
first logic conversion means for converting successive groups of four data bits or one "half-byte" from said data processing apparatus into eight bit code groups, with at least two binary 0's separating each binary 1 in the continuous output stream of code bits, and at least one binary 1 included in each code group;
means for magnetically recording said code bits, with said binary 1's being represented by magnetic flux reversals;
circuit means coupled to receive digital signals from said recording means and for generating timing or clock signals for said data processing system;
second logic conversion means for decoding said eight bit code groups and forming four bit data groups; and
means for coupling both of said logic conversion means substantially directly with said data processing circuitry;
whereby extensive buffering between code groups and the eight digit bytes processed in said data processing apparatus is not required, and the need for a tightly controlled special phase lock oscillator is avoided.

14. A digital data processing system including compatible high density magnetic recording, comprising:
a data processing apparatus operating with eight bit "bytes" or four bit half-bytes of data;
logic conversion means for (1) converting successive groups of four data bits of one "half-byte" from said data processing apparatus into eight bit code groups, with at least two binary 0's separating each binary 1 in the continuous output stream of code bits, and at least one binary 1 included in each code group; and for (2) decoding said eight bit code groups and forming four bit data groups;
means for magnetically recording said code bits, with said binary 1's being represented by magnetic flux reversals;
phase lock oscillator circuit means coupled to receive digital signals from said recording means and for generating timing or clock signals for said data processing system, said oscillator having the capability of maintaining synchronization with said code signals upon receipt of at least one binary 1 during each eight bit code interval; and
means for coupling said logic conversion means substantially directly with said data processing circuitry;
whereby extensive buffering between said code groups and the eight digit bytes processed in said data processing apparatus is not required, and the need for a tightly controlled special phase lock oscillator is avoided.

* * * * *